(12) United States Patent
Shulman et al.

(10) Patent No.: US 9,128,941 B2
(45) Date of Patent: Sep. 8, 2015

(54) ON-DEMAND CONTENT CLASSIFICATION USING AN OUT-OF-BAND COMMUNICATIONS CHANNEL FOR FACILITATING FILE ACTIVITY MONITORING AND CONTROL

(71) Applicant: Imperva, Inc., Redwood Shores, CA (US)

(72) Inventors: Amichai Shulman, Tel Aviv (IL); Rotem Naar, Rehovot (IL); Moshe Einhorn, Tel Aviv (IL)

(73) Assignee: Imperva, Inc., Redwood City, CA (US)

( * ) Notice: Subject to any disclaimer, the term of this patent is extended or adjusted under 35 U.S.C. 154(b) by 281 days.

(21) Appl. No.: 13/787,536

(22) Filed: Mar. 6, 2013

(65) Prior Publication Data

US 2014/0258294 A1    Sep. 11, 2014

(51) Int. Cl.
*G06F 17/30* (2006.01)
*G06F 17/27* (2006.01)
*H04L 12/851* (2013.01)

(52) U.S. Cl.
CPC ...... *G06F 17/30082* (2013.01); *G06F 17/2785* (2013.01); *H04L 47/2441* (2013.01)

(58) Field of Classification Search
CPC .......... G06F 17/30082; G06F 17/2785; H04L 47/2441
USPC .......................... 707/693, 737, 754, 769, 802
See application file for complete search history.

(56) References Cited

U.S. PATENT DOCUMENTS

| | | | |
|---|---|---|---|
| 8,155,649 B2 * | 4/2012 | McHenry et al. | 455/434 |
| 8,190,585 B2 * | 5/2012 | Salemann | 707/693 |
| 8,296,562 B2 * | 10/2012 | Williams et al. | 713/155 |
| 8,739,272 B1 * | 5/2014 | Cooper et al. | 726/13 |
| 8,767,767 B2 * | 7/2014 | Driscoll et al. | 370/445 |
| 9,049,073 B2 * | 6/2015 | Klappert et al. | 1/1 |
| 2010/0250497 A1 * | 9/2010 | Redlich et al. | 707/661 |
| 2011/0078129 A1 * | 3/2011 | Chunilal | 707/706 |
| 2011/0219424 A1 * | 9/2011 | Panasyuk et al. | 726/1 |

* cited by examiner

*Primary Examiner* — Jay Morrison
*Assistant Examiner* — Dangelino Gortayo
(74) *Attorney, Agent, or Firm* — Fenwick & West LLP

(57) ABSTRACT

Communications to a server over an in-band communications channel are monitored for requests to access a file. Based on the communications, a request to access a particular file stored by the server is identified. Security and/or audit rules are identified based on the request. A determination is thereafter made that the security and/or audit rules require evaluation of classification information for contents of the requested file. Thus, a determination is made as to whether classification information for the contents of the particular file is available, such as determining whether the classification information is stored in a local classification cache. Responsive to a determination that the classification information is not available, classification information is obtained for the contents of the particular file using an out-of-band communications channel. Thereafter, processing with respect to the request to access the particular file is performed based on the obtained classification information and the one or more security and/or audit rules.

18 Claims, 9 Drawing Sheets

ON-DEMAND CONTENT CLASSIFICATION USING AN OUT-OF-BAND COMMUNICATIONS CHANNEL FOR FACILITATING FILE ACTIVITY MONITORING AND CONTROL

BACKGROUND

1. Field of Disclosure

This invention relates to facilitating file activity monitoring and file access control through performance of on-demand file content classification using an out-of-band communications channel.

2. Description of the Related Art

In modern computing, data files are often remotely stored on various file servers accessible over a variety of different networks. User devices retrieve such files by sending access requests over the networks to the file servers, and responsively receiving the requested files. In certain instances, those files stored by the file servers include sensitive types of data, such as financial records, health records, personal information, etc. In order to manage access to such sensitive files, many organizations employ various systems for monitoring and controlling access to files stored by their file servers.

Many current systems employ various file security and/or audit policies to monitor and control access to files. Such policies often are associated with various rules requiring classification of the contents of the files, and the performance of specific actions responsive to the classification. For example, a particular audit rule may specify that a system record an observed access to a file responsive to a determination that the contents of the file include certain types or classes of sensitive data. Current systems take one of two approaches in classifying the contents of files: exhaustive pre-classification of all the files on a file server, or on-the-fly classification performed during file access.

In the former approach, a system performs lengthy and complex classifications of the contents of each file stored by a file server. As a consequence of such an approach, the system is incapable of using rules requiring file content classifications until such processing is completed, which may take many months. Furthermore, during periods of classification, server and network loads are dramatically increased. Moreover, as files and/or classification decision rules are updated and/or added, classification of at least some of the files must be repeated. Such repeated processing prolongs increased file server and network loads. Further, the performance of file activity monitoring and file access control may be sluggish as large databases must be searched in order to identify a file's classification information.

In the latter approach, a system performs a classification each time a file requiring classification is accessed through the network. In the approach, the system obtains the file to be classified by reading the file as the file is transferred over a communications channel between a user device and file server. One problem with such an approach is that, at times, only a portion of a file may be transferred. Thus, the system is not always able to perform classification on the entirety of the file. As a result, the file may be inaccurately classified, which affects the system's ability to correctly apply security and/or audit rules. Furthermore, some user devices perform multiple accesses to a file even in a single application transaction (e.g., a read to a document for a word processing application executed on a user device). As a result, performing classifications each time a file is accessed can incur large computational burdens on the system. Moreover, because content classification is performed on-the-fly for each file access, significant delays in applying security and/or audit rules may be introduced. For example, a file may be accessed numerous times before the system is able to determine that access to the file should be restricted.

SUMMARY

The above and other issues are addressed by a method, a non-transitory computer-readable storage medium, and a system for performing on-demand content classification using an out-of-band communications channel.

One embodiment of the method includes monitoring communications to a server over an in-band communications channel. Based on the communications, a request to access a particular file stored by the server is identified. One or more security and/or audit rules are then identified based on the request to access the particular file. A determination is thereafter made that the security and/or audit rules require evaluation of classification information for contents of the requested file. Thus, a determination is made as to whether classification information for the contents of the particular file is available, such as determining whether the classification information is stored in a locally accessible classification cache. Responsive to a determination that the classification information for the contents of the particular file is not available, classification information is obtained for the contents of the particular file using an out-of-band communications channel. Thereafter, processing with respect to the request to access the particular file is performed based on the obtained classification information and the one or more security and/or audit rules.

Embodiments of the computer-readable storage medium store computer-executable instructions for performing the steps described above. Embodiments of the system further include a processor for executing the computer-executable instructions.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION

I. Overview

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1A:
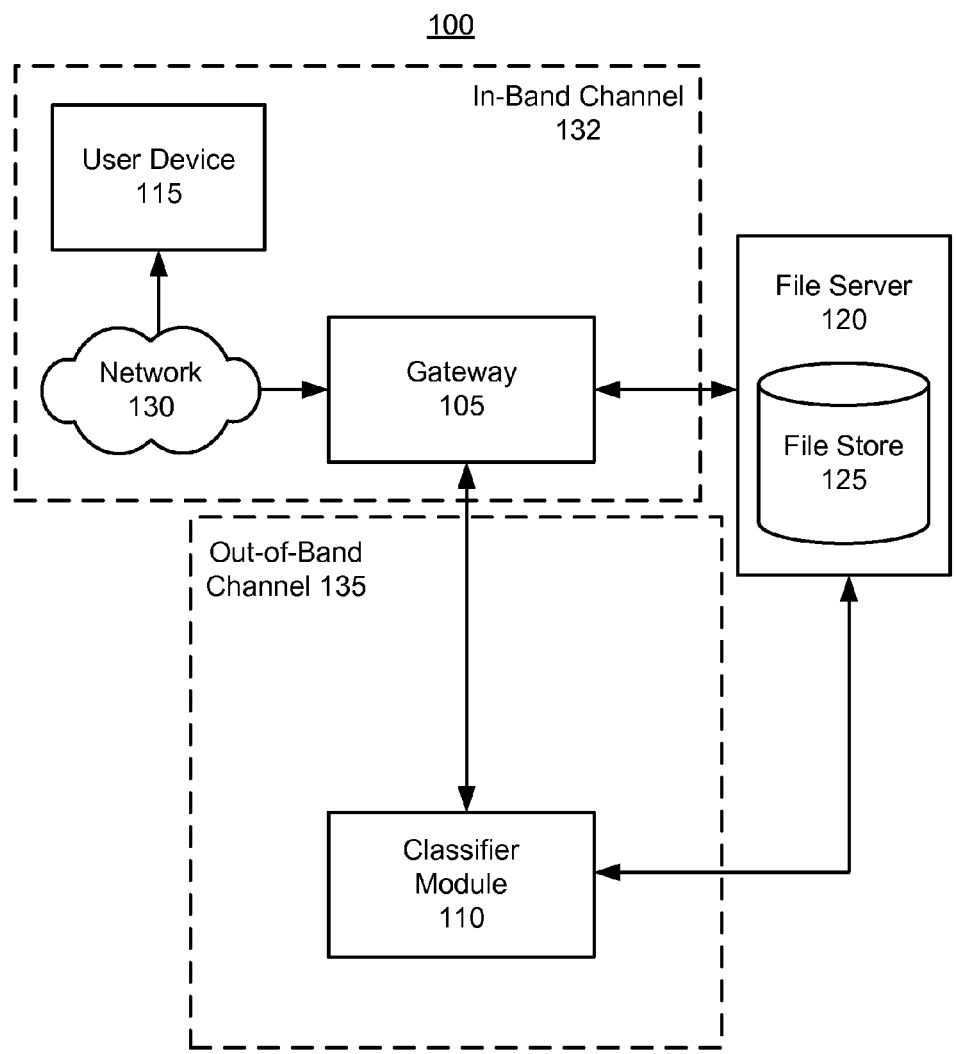
FIG. 1A is a high-level diagram illustrating a typical environment for performing on-demand content classification using an out-of-band communications channel according to one embodiment.
Figure 1B:
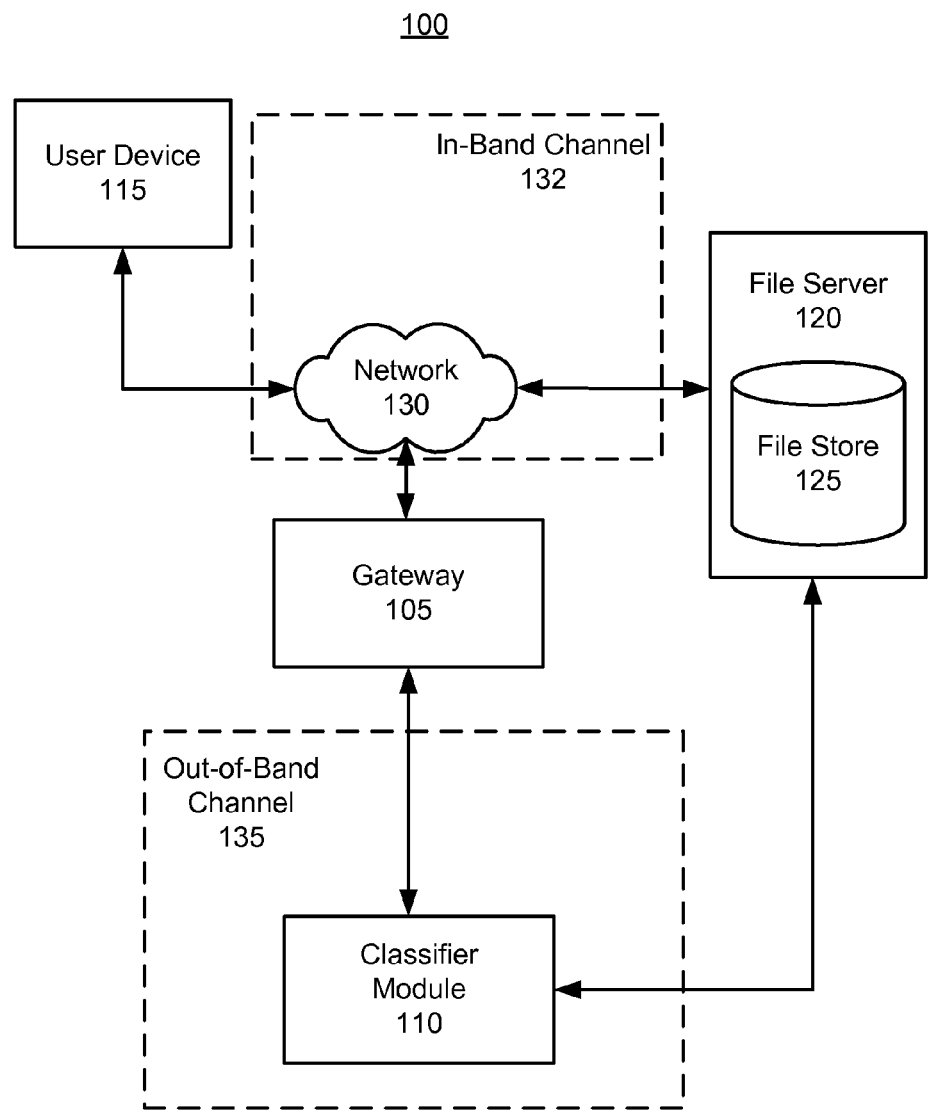
FIG. 1B is a high-level diagram illustrating a typical environment for performing on-demand content classification using an out-of-band communications channel according to another embodiment.

FIGS. 1A and 1B each illustrates a different embodiment of a typical environment 100 usable for performing file activity monitoring and file access control. In one aspect, the environment 100 may be used to determine classifications for the contents of files "on-demand" or as the files are being accessed. In the aspect, determining the classifications of the files is performed through using an out-of-band communications channel. Determining the classifications of the files may further be performed through using one or more local caches. As shown in each of FIGS. 1A and 1B, the environment 100 includes a gateway 105, a classifier module 110, a user device 115, a file server 120, and a network 130. Only one gateway 105, one classifier module 110, one user device 115, and one file server 120 are shown in each of FIGS. 1A and 1B for purposes of clarity, but those of skill in the art will recognize that typical environments can have hundreds or thousands of user devices 115, and can also have multiple gateways 105, classifier modules 110, and file servers 120. For example, a single file server 120 may provide access to various stored files to thousands of different user devices 115.

The network 130 enables the various entities of the environment 100 to communicate. Although not explicitly shown in FIGS. 1A and 1B, a communications channel between the user device 115, gateway 105, and/or file server 120 may be established entirely or substantially over the network 130. Likewise, a communications channel between the gateway 105, the classifier module 110, and the file server 120 may be established entirely or substantially over the network 130. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), the common internet file system (CIFS), the network file system (NFS), etc. In addition, all or some of the links of the network 130 can be encrypted using conventional encryption technologies such as secure sockets layer (SSL), transport layer security (TLS), virtual private networks (VPNs), Internet Protocol security (IPsec), etc. In some embodiments, the network 130 can use custom and/or dedicated data communications technologies instead of, or in addition to, the ones described above. Depending upon the embodiment, the network 130 can also include links to other networks such as the Internet.

The in-band channel 132 is a communications channel over which the user device 115 and the file server 120 communicate (e.g., channel over which access to files is requested). In one embodiment, the in-band channel 132 includes one or more connections between the user device 115 and the file server 120 over the network 130. The out-of-band communications channel 135 is a communications channel over which the gateway 105, the classifier module 110, and the file server 120 communicate. The out-of-band communications channel 135 includes one or more connections between the gateway 105, classifier module 110, and file server 120 over the network 130 that are different from the one or more connections between the user device 115 and the file server 120. In one embodiment, the connections of the in-band channel 132 and the connections of the out-of-band communications channel 135 may be established over the same physical links of the network 130. In such an embodiment, the connections of the in-band channel 132 are logically different from the connections of the out-of-band communications channel 135. In other embodiments, the connections of the in-band channel 132 and the connections of the out-of-band communications channel 135 may be established over different physical links of the network 130. In yet other embodiments, the out-of-band communications channel 135 may be a communications channel including one or more connections established over a network that is separate from and/or independent of the network 130.

The user device 115 is a computing device usable by a user to store and/or request access to files from the file server 120. In one aspect, the user device 115 is a conventional computer system executing, for example, a Microsoft Windows-compatible operating system (OS), Apple OS X, UNIX, and/or a Linux distribution. The user device 115 can be any type of computer system, such as a laptop, desktop, workstation, or server. The user device 115 can also be another device having computer functionality, such as a personal digital assistant (PDA), mobile telephone, tablet device, etc.

The file server 120 is a computing system that stores a number of files, and retrieves the files in response to file access requests received from the user device 115. In one implementation, the file server 120 includes one or more computing devices (e.g., clusters of computers) configured to facilitate file storage and/or retrieval. The computing devices of the file server 120 may be in the same physical location, or situated across multiple different locations. In one aspect, the computing devices of the file server 120 may each be a conventional computer system executing, for example, a Microsoft Windows-compatible operating system (OS), Apple OS X, UNIX, and/or a Linux distribution. A computing device of the file server 120 can also be any type of computer system, such as a laptop, desktop, workstation, or server. A computing device of the file server 120 can also be another device having computer functionality, such as a personal digital assistant (PDA), mobile telephone, tablet device, etc.

The gateway 105 is a computing system that monitors or "listens" to network traffic over the network 130 for communications (e.g., requests for files) between the user device 115 and the file server 120. Referring to FIGS. 1A and 1B, each illustrates a different configuration of the environment 100 relating to the gateway 105. In FIG. 1A, the gateway 105 is additionally configured to serve as an intermediary or bridge between the user device 115 and the file server 120. Thus, the gateway 105 receives communications from the user device 115 and forwards the communications to the file server 120, and vice versa. In FIG. 1B, the gateway 105 does not act as an intermediary between the user device 115 and the file server 120. Hence, the gateway 105 shown in FIG. 1B does not perform forwarding functionality with respect to communications between the user device 115 and the file server 120.

In one embodiment, the gateway 105 additionally applies a set of security and/or audit rules to observed communications, and performs further processing based on application of the security and/or audit rules. More specifically, each security and/or audit rule may indicate specific processing that is to be performed responsive to identification of a communication between the user device 115 and the file server 120 meeting certain criteria. For example, a security rule may indicate a notification be sent to a system administrator of the file server 120 responsive to identification of a request to access a file from the user device 115 to the file server 120. As another example, an audit rule may indicate that information regarding an observed access of a particular file by the user device 115 be recorded in an audit log.

In some embodiments, the security and/or audit rules may require evaluation of the contents of those files being accessed by the user device 115 for sensitive types of data. To evaluate the contents of the files, the gateway 105 determines, on-demand and in conjunction with the classifier module 110, classification information for the contents of the files using the out-of-band communications channel 135. The classification information includes information regarding any sensitive data types within the contents of the files, such as financial records, health records, personal information, etc. Such determinations may be performed synchronously or in parallel with accesses of the files by the user device 115. To determine the classification information for the contents of the requested file, the gateway 105 searches a local cache for the classification information. If the classification information is not located in the local cache, the gateway 105 sends a request for the classification information to the classifier module 110 via the out-of-band communications channel 135. Responsive to sending the request, the gateway 105 receives, from the classifier module 110, information regarding the classifications for the contents of the file via the out-of-band communications channel 135. Based on the classification information, the gateway 105 may perform additional security and/or audit-related processing based on the security and/or audit rules. The gateway 105 additionally stores the classification information for the file in its local cache, thereby allowing the classification information to be quickly retrieved if the file is subsequently accessed by the user device 115 (or any other user device).

The classifier module 110 generates classification information for the contents of a file and provides the classification information to the gateway 105 via the out-of-band communications channel 135. In particular, the classifier module 110 receives a request for classification information for a particular file from the gateway 105. Responsive to the request, the classifier module 110 determines if classification information for the particular file is located in a local cache of the classifier module 110. If the classification information is not located in the local cache, the classifier module 110 obtains the file from the file server 120 via the out-of-band communications channel 135. Thereafter, the classifier module 110 processes the file in order to determine whether the contents of the file include any sensitive types of data, such as financial records, health records, personal information, etc. Based on the processing, the classifier module 110 provides classification information including the different types of sensitive data in the contents of the file to the gateway 105. The classifier module 110 additionally stores the classification information for the file in its local cache. Based on the classification information, the gateway 105 may perform additional security and/or audit-related processing.

It will be appreciated that the functions of the described gateway 105, classifier module 110, and/or file server 120 may be combined or integrated in any suitable manner. For example, any combination of the functionalities described with respect to the entities may be performed by a single entity (e.g., a single computing device or logically grouped set of computing devices). In some embodiments, the single entity may execute a virtual machine hypervisor configured to run and manage multiple virtual machines, where each virtual machine performs one or more functionalities of the gateway 105, the classifier module 110, and/or the file server 120.

Through implementing on-demand content classification using an out-of-band communications channel in the manner described, embodiments enable file monitoring and access control to be performed efficiently and accurately. More specifically, because content classification is performed on-demand, extended pre-classification of all the files stored by a file server is not required. Thus, embodiments enable systems to become operational more rapidly, and limit excessive file server and network loads. Moreover, because classification information for previously classified files is stored in local caches, embodiments enable security and/or audit rules to be applied rapidly for frequently accessed files. As a result, delays in applying security and/or audit rules due to content classification can be reduced. Further, embodiments enable security and/or audit rules to be more accurately applied. Specifically, only a portion of a file may be transmitted between a user device and a file server over an in-band channel. Classifying the file based on only the transmitted portion leads to incorrect classifications and, as a consequence, inaccurate application of security and/or audit rules. By retrieving the entirety of a file over an out-of-band communications channel, embodiments enable the entirety of a file to be classified, which permits the security and/or audit rules to be accurately applied.

II. Example System Architecture

Figure 2:
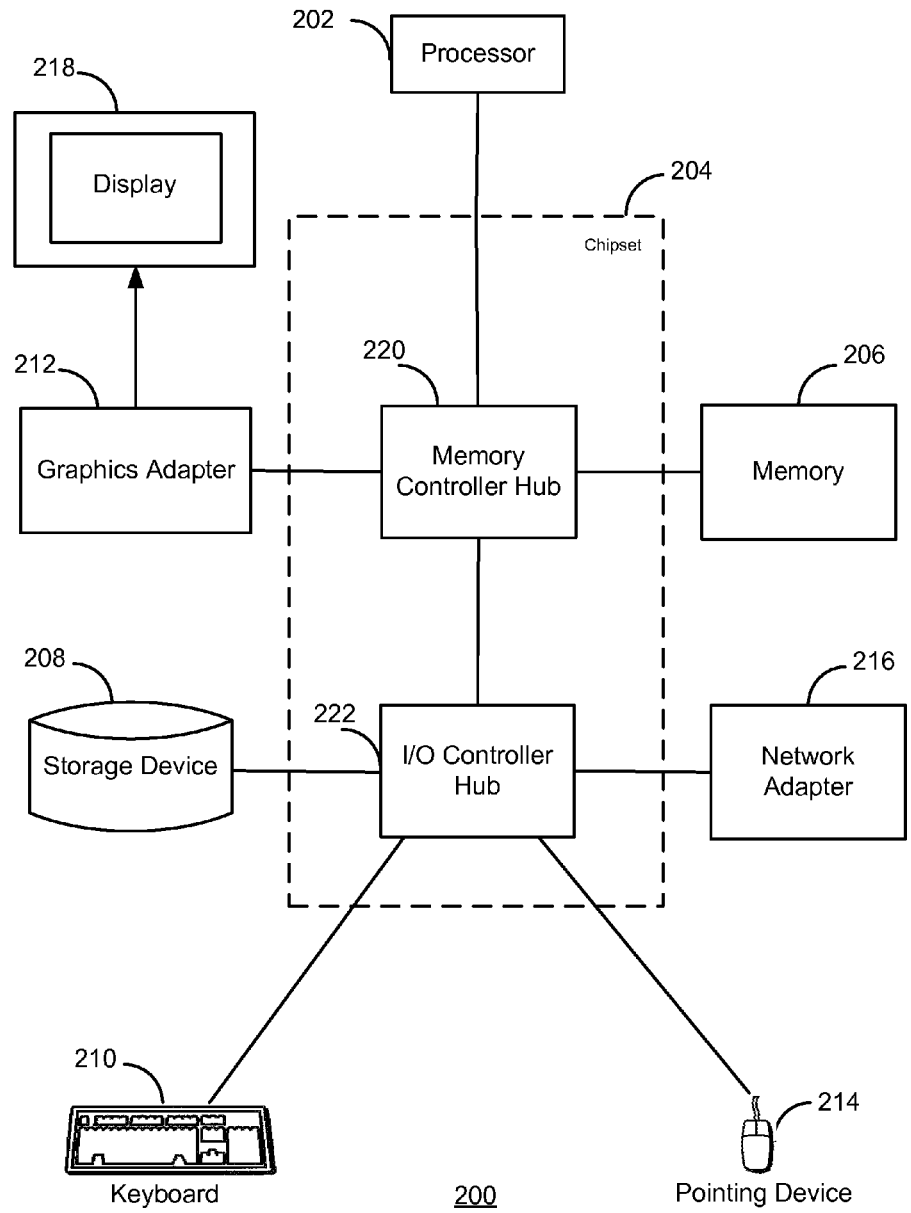
FIG. 2 is a high-level block diagram of a computer system for performing on-demand content classification using an out-of-band communications channel according to one embodiment.

FIG. 2 is a high-level block diagram of a computer 200 for performing on-demand classification of files using an out-of-band communications channel according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 130.

As is known in the art, a computer 200 can have different and/or other components than those shown in FIG. 2. In addition, the computer 200 can lack certain illustrated components. In one embodiment, a computer 200 acting as the gateway 105, classifier module 110, and/or file server 120 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

III. Gateway Overview

Figure 3A:
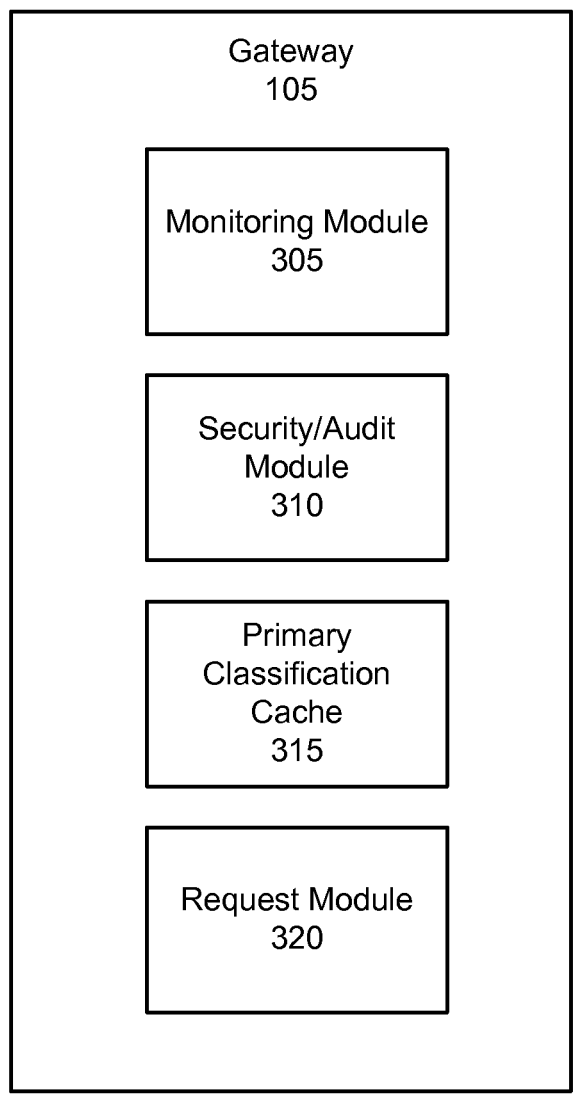
FIG. 3A is a high-level block diagram illustrating a detailed view of modules within a gateway according to one embodiment.

FIG. 3A is a high-level block diagram illustrating a detailed view of modules within the gateway 105 according to one embodiment. Some embodiments of the gateway 105 have different and/or other modules than the ones described herein. Similarly, the functions can be distributed among the modules in accordance with other embodiments in a different manner than is described here. Likewise, the functions can be performed by other entities. As shown in FIG. 3A, the gateway 105 includes a monitoring module 305, a security/audit module 310, a primary classification cache 315, and a request module 320.

The monitoring module 305 monitors or observes communications between the user device 115 and the file server 120. More specifically, various packets of data may be exchanged between the user device 115 and the file server 120. As the packets of data are exchanged, the monitoring module 305 examines at least a portion of the exchanged packets. In examining the packets of data, the monitoring module 305 analyzes the exchanged packets of data to determine whether a request for access to a file has been sent by the user device 115 to the file server 120. For instance, the monitoring module 305 may determine that a user device 115 has requested access to a particular file from the file server 120 by identifying a file access instruction in a data packet sent from the user device 115 to the file server 120. The monitoring module 305 may additionally extract file identification information from the data packet. The file identification information may indicate the particular file that the user device 115 is requesting to access. The file identification information may be, for example, a filename, a unique file number, etc.

Responsive to identification that the user device 115 has requested access to a particular file from the file server 120, the monitoring module 305 provides information regarding the file access request to the security/audit module 310. In particular, the monitoring module 305 generates a file access event for the file access request, and provides the file access event to the security/audit module 310. The file access event may be a data structure including identification information for the user device 115 (e.g., a user device name, a user device number, a user account associated with the user device, an associated MAC address, an associated IP address, etc.), the identification information for the requested file, and a type of access requested by the user device 115.

In some embodiments, the gateway 105 acts as an intermediary or bridge between the user device 115 and the file server 120 over the network 130. Thus, the monitoring module 305 receives communications from the user device 115 destined for the file server 120, and forwards the communications to the file server 120. Additionally, the monitoring module 305 receives communications from the file server 120 destined for the user device 115, and forwards the communications to the user device 115. In other embodiments, the gateway 105 does not act as an intermediary between the user device 115 and the file server 120 over the network 130. In such embodiments, the monitoring module 305 still observes communications between the user device 115 and the file server 120, but does not forward the communications as in the former embodiments.

In one aspect, the monitoring module 305 further manages the communications between the user device 115 and file server 120 based on instructions received from the security/audit module 310. For example, an instruction from the security/audit module 310 may indicate that a particular file cannot be accessed by the user device 115. Hence, when the monitoring module 305 identifies a request to access the particular file from the user device 115 to the file server 120, the monitoring module 305 either prevents the request from being forwarded to the file server 120, or performs any other suitable measure (e.g., indicating to the file server 120 that the request not be fulfilled).

The primary classification cache 315 is a local cache that stores classification information for files. The classification information includes any suitable data about the contents of a file. In particular, the classification information includes information regarding any sensitive data types identified in the contents of the file. Sensitive data types include credit card data, financial records, health records, personal information (e.g., social security numbers), user access information (e.g., usernames and/or passwords), etc. In instances, where the contents of a file do not include sensitive types of data, the classification information may expressly indicate that the file does not include any sensitive types of data, or implicitly indicate the same by not specifying any sensitive types of data.

In one aspect, the primary classification cache 315 is maintained according to a least recently used (LRU) cache replacement policy. As such, older and less frequently accessed data in the cache is periodically removed. As a result, the size of the primary classification cache 315 can be kept small, and relatively up to date. In one aspect, classification information for files that have undergone changes and/or have been deleted from the file server 120 is automatically removed from the primary classification cache 315. Notification of such changes or deletions may be received from the file server 120. Upon receiving such a notification and/or removing an entry, the primary classification cache 315 may cause the monitoring module 305 to provide the classifier module 110 with the notification.

The security/audit module 310 applies one or more security and/or audit rules to communications observed by the monitoring module 305. In particular, the security/audit module 310 receives a file access event from the monitoring module 305 regarding a file requested for access by the user device 115. Based on the received file access event, the security/audit module 310 identifies one or more security or audit rules that apply to the event. In some instances, the security/audit module 310 identifies applicable security and/or audit rules based on the user device 115 requesting access to the file. For example, the security/audit module 310 identifies security and/or audit rules that are associated with unique identification information for the user device 115 (e.g., a unique identifier, a media access control (MAC) address, etc.), a type for the user device 115 (e.g., a desktop computer, a mobile phone, etc.), a geographic location for the user device 115 (e.g., a location based on an internet protocol (IP) address, etc.), a user account associated with the user device 115, an application executing on the user device 115 used to request access to the file, and/or any other information related to the user device 115. As a specific example, the security/audit module 310 retrieves security or audit rules based on the user device 115 being situated outside of the United States.

In other instances, the security/audit module 310 identifies applicable security and/or audit rules based on the file requested for access. For example, the security/audit module 310 may identify security and/or audit rules based on the file being associated with particular identification information (e.g., a particular filename), a particular type or format, etc. As a specific example, the security/audit module 310 may retrieve specific security and/or audit rules for a file in the MICROSOFT EXCEL format.

After identifying the security and/or audit rules, the security/audit module 310 performs processing with respect to the file access event. In particular, the security and/or audit rules may specify certain attributes (e.g., a filename) of the file to be evaluated by the security/audit module 310. In one embodiment, the security and/or audit rules specify that the contents of the file be evaluated for certain sensitive types of data by the search/audit module 310. Responsive to a determination that the security and/or audit rules require such an evaluation, the security/audit module 310 accesses the primary classification cache 315. In particular, the security/audit module 310 may use the filename or some other identification information for the file to request retrieval of an entry stored by the primary classification cache 315 corresponding to the file. Responsive to the retrieval request, the security/audit module receives either an entry including classification information indicating the sensitive data types for the file, or an indication that an entry for the requested file cannot be located in the primary classification cache 315.

If classification information is received from the primary classification cache 315, the security/audit module 310 applies the identified security and/or audit rules to the file access event using the classification information. Based on application of the identified security and/or audit rules, the security/audit module 310 may perform further processing. For example, an audit rule for the file may indicate that an entry describing the file access by the user device 115 be recorded or logged in an audit log associated with the file server 120 if the file includes health records. Hence, if the classification information for the file is determined to include health records, the security/audit module 310 records the file access in the audit log. As another example, a security rule for the requested file may indicate that any future accesses to the file by the user device 115 be denied if the requested file includes credit card data. Hence, if the classification information for the requested file is determined to include credit card data, the security/audit module 310 may instruct the monitoring module 305, the file server 120, and/or any other suitable entity that future access requests for the file from the user device 115 be denied.

In one aspect, if an indication is received that an entry for the requested file is not stored in the primary classification cache 315, the security/audit module 310 requests classification information for the contents of the requested file by sending a request to the request module 320. The request sent to the request module 320 may include identification information for the requested file. Responsive to providing the request, the security/audit module 310 receives classification information for the contents of the requested file from the request module 320. The classification information may indicate the types of sensitive data included in the requested file, if any. After receiving the classification information from the request module 320, the security/audit module 110 stores the classification information for the file in the primary classification cache 315. In particular, the security/audit module 110 provides a request to the primary classification cache 315 to store an entry for the file, where the entry includes the received classification information for the file. In addition, the security/audit module 310 applies the identified security and/or audit rules to the file access event using the classification information. Based on application of the identified security and/or audit rules, the security/audit module 310 may perform further processing as described previously.

The request module 320 sends requests for classification information for the contents of the files to the classifier module 110 via the out-of-band communications channel 135 responsive to requests for the classification information received from the security/audit module 310. The requests sent by the request module 320 may include, at least, identification information for the requested files, such as filenames. The request module 320 additionally receives classification information from the classifier module 110 via the out-of-band communications channel 135. The received classification information may be sent to the security/audit module 310 for processing.

In one embodiment, the gateway 105 may send requests for classification information to multiple classifier modules 110. For example, upon determining that the classification information for a particular file is needed, the request module 320 of the gateway 105 may select a classifier module 110 to send a request for classification information for the contents of the file. Selection of the classifier module 110 can be based on any suitable criteria. For example, the request module 320 may select a classifier module 110 based on the relative load of the classifier module 110. Illustratively, the request module 320 may select a classifier module 110 with the least amount of load among a set of classifier modules 110. In this way, the load across multiple classifier modules 110 can be balanced.

IV. Classifier Module Overview

Figure 3B:
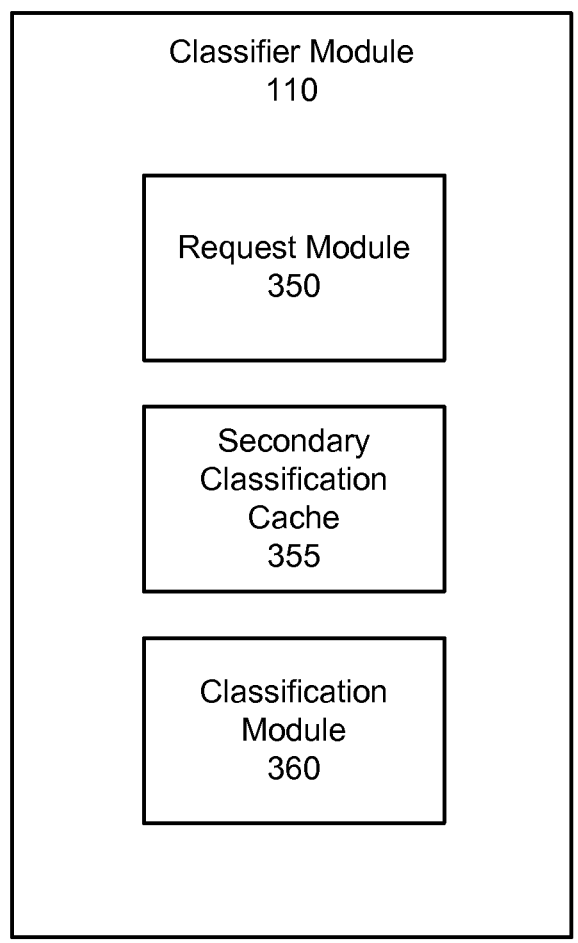
FIG. 3B is a high-level block diagram illustrating a detailed view of modules within a classifier module according to one embodiment.

FIG. 3B is a high-level block diagram illustrating a detailed view of modules within the classifier module 110 according to one embodiment. Some embodiments of the classifier module 110 have different and/or other modules than the ones described herein. Similarly, the functions can be distributed among the modules in accordance with other embodiments in a different manner than is described here. Likewise, the functions can be performed by other entities. As shown in FIG. 3B, the classifier module 110 includes the request module 350, the secondary classification cache 355, and the classification module 360.

The secondary classification cache 355 is a local cache that stores classification information for files. The classification information includes any suitable data about the contents of a file, including any sensitive data types contained in the contents of the file. In instances where the contents of a file does not include sensitive types of data, the classification information may expressly indicate that the file does not include any sensitive types of data or implicitly indicate the same by not specifying any sensitive types of data.

In one aspect, the secondary classification cache 355 is maintained according to a least recently used (LRU) cache replacement policy. As such, older and less frequently accessed data in the cache is periodically removed. In one aspect, the secondary classification cache 355 is larger in size (e.g., storage capacity) than the primary classification cache 315. As a result, older and less often accessed files are removed from the cache with a frequency that is lower than that of the primary classification cache 315. In one aspect, classification information for files that have undergone changes and/or have been deleted from the file server 120 is automatically removed from the secondary classification cache 355. Notification of such changes or deletions may be received from the file server 120 and/or the gateway 105.

The request module 350 receives requests for classification information from the gateway 105, and responsively provides the requested classification information to the gateway 105. In particular, after receiving a request for classification information for the contents of a file, the request module 350 sends a request to the secondary classification cache 355 for the classification information. Responsive to the request, the request module 350 receives either the classification information, or an indication that an entry for the file cannot be located in the secondary classification cache 355. If classification information for the contents of the requested file is identified in the secondary classification cache 355, the request module 350 sends the classification information to the gateway 105. If classification information for the contents of the requested file is not in the secondary classification cache 355, the request module sends a request to classify the contents of the file to the classification module 360. Responsive to sending the request, the request module 350 receives classification information for the contents of the file from the classification module 360. The request module 350 thereafter provides the classification information to the gateway 105.

The classification module 360 generates classification information for the contents of one or more files. In one embodiment, the classification module 360 receives a new classification request from the request module 350. After receiving the new classification request, the classification module 360 determines whether to add a new classification job for the new request to a classification queue. In order to determine whether a new classification job be added to the classification queue, the classification module 360 determines whether an existing classification job for the file indicated by the new classification request is already in the classification queue. If an existing classification job for the file is already in the classification queue, the classification module 360 does not add a new classification job for the file into the queue. Rather, the classification module 360 updates the existing classification job to indicate that any generated classification information for the file is to be provided responsive to the new classification request. Such an indication is in addition to an indication that any generated classification information be provided responsive to an earlier classification request that prompted creation of the existing classification job. In this way, the classification module 360 avoids unnecessarily classifying the contents of a file multiple times. If an existing classification job for the file is not in the classification queue, the classification module 360 adds a new classification job for the file to the classification queue.

To process an individual classification job, the classification module 360 retrieves the entirety of the file to be classified from the file server 120 via the out-of-band communications channel 135. Any suitable method may be used to obtain the file from the file server 120. In one implementation, the classification module 360 obtains the file from the file server 120 using a suitable file sharing protocol, such as the common internet file system (CIFS) protocol or the network file system (NFS) protocol.

In another implementation, the classification module 360 communicates with a lightweight file delivery agent application executed by the file server 120 to retrieve the file. In particular, the classification module 360 communicates with the agent using a suitable network protocol. For example, the classification module 360 sends the name of the file to the agent, and the agent responsively provides the contents of the file to the classification module 360. In one aspect, the communications transmitted between the agent and the classification module 360 is secured using a suitable encryption scheme. Furthermore, in communicating with the agent, the classification module 360 may authenticate with the agent by using a suitable strong or multi-factor authentication scheme. In doing so, it can be ensured that only authorized entities are able to obtain files from the agent of the file server 120.

After obtaining the file, the classification module 360 classifies the contents of the file using any suitable method. In one embodiment, the classification module 360 classifies the file based on pattern matching. For example, the classification module 360 may store one or more patterns indicative of sensitive data types. In classifying the contents of the file, the classification module 360 identifies matches between the stored patterns and the contents of the file. Based on the identified matches, the classification module 360 identifies sensitive types of data included in the contents of the file. Such identified sensitive data types are thereafter included in the classification information for the file. As another example, the classification module 360 may employ a suitable classification processor to identify sensitive types of data in the contents of the file. In one aspect, the classification processor may have been initially trained to identify sensitive data types. In the aspect, training of the classification processor may be performed using a set of sample file contents by a systems operator associated with the classification module 360.

Following classification of the file, the classification module 360 stores an entry for the file in the secondary classification cache 355. In particular, the classification module 360 requests that an entry for the file be inserted in the secondary classification cache 355 that includes identification information for the file and the generated classification information for the file. As a result, subsequent requests for classification information for the file may be retrieved from the secondary classification cache 355, subject to replacement of the entry for the file by the secondary classification cache 355. The classification module 360 further provides the classification information to the request module 350. The classification module 360 may further indicate the request or requests previously received from the request module 350 that are fulfilled by the classification information.

In one embodiment, the classifier module 110 may be configured to receive and respond to requests for classification information from multiple gateways 105. In doing so, the distribution of classification information may be accelerated relative to embodiments where each gateway 105 communicates with a different classifier module 110. Specifically, multiple gateways 105 may require classification of the same file. Configuring each gateway to communicate with a different classifier module 110 would cause the same file to be processed for classification several times. In contrast, by configuring the gateways 105 to access the same classifier module 110, the file can be processed for classification a first time, and subsequent requests for classification information can be fulfilled by quickly retrieving the information from the secondary classification cache 355, so long as the classification information has not been replaced.

Figure 4:
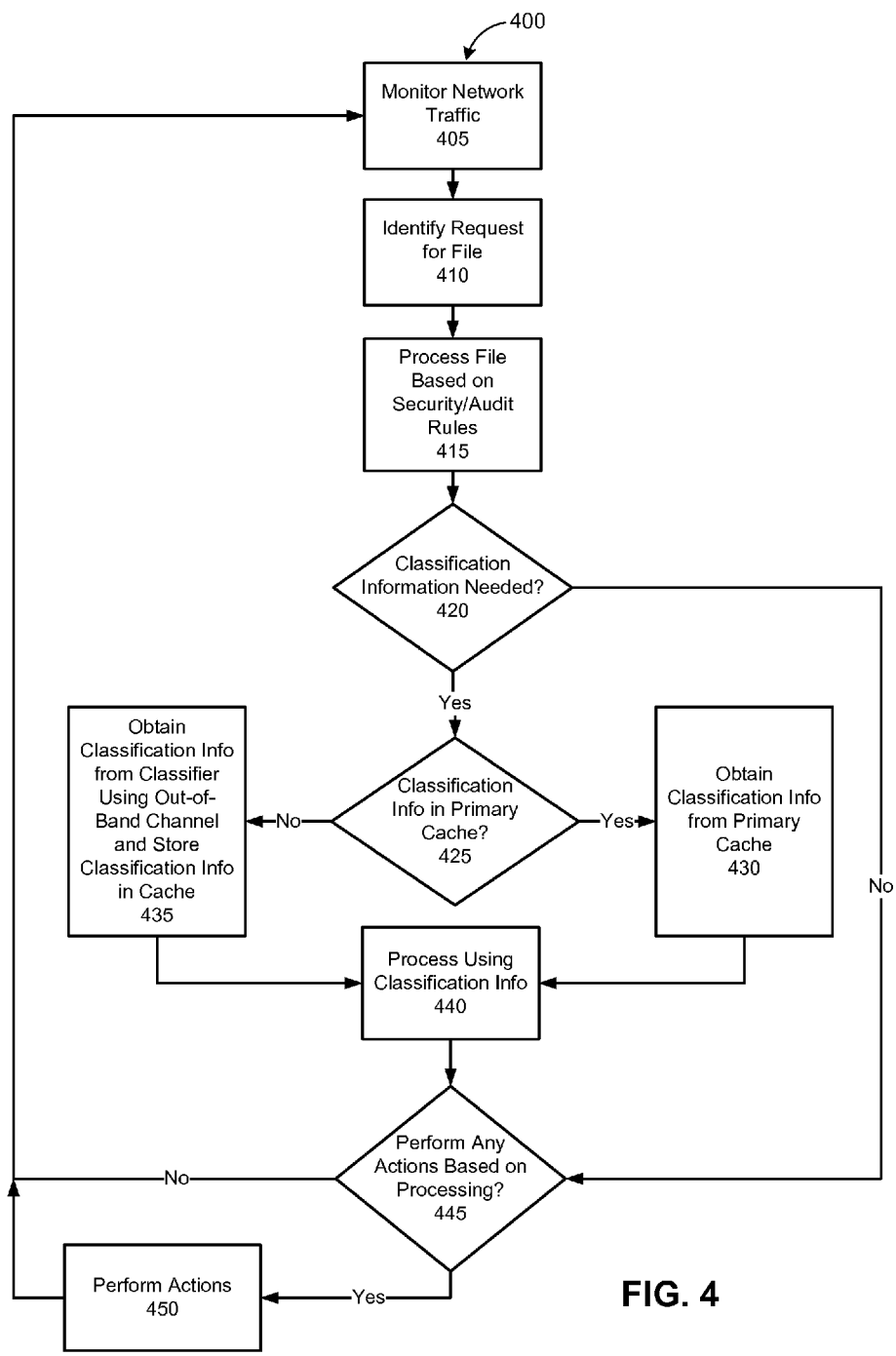
FIG. 4 is a flow chart illustrating a method for performing on-demand content classification using an out-of-band communications channel by a gateway according to one embodiment.

V. Methods for Implementing on-Demand Content Classification Using an Out-of-Band Communications Channel FIG. 4 is a flowchart illustrating a method for performing on-demand content classification using an out-of-band communications channel by a gateway according to one embodiment. Other embodiments can perform the steps of the method in different orders and can include different, additional and/or fewer steps. The method shown in FIG. 4 can be performed by the gateway 105. In the method, the gateway 105 monitors or observes 405 network traffic to the file server 120. Based on the monitoring, the gateway 105 identifies 410 a request to access a file stored by the file server 120.

Thereafter, the gateway 105 performs processing 415 with respect to the file based on one or more security and/or audit rules. In performing the processing, the gateway 105 determines 420 whether classification information for the contents of the file is required in order to apply the security and/or audit rules. In particular, one or more security and/or audit rules may require information regarding whether the contents of the file include any sensitive types of data, such as health records, financial records, personal information, credit card data, etc. If it is determined that classification information for the contents of the file is required, the gateway 105 determines 425 whether classification information for the file is located in the primary classification cache 315 of the gateway 105. Responsive to a determination that the classification information is in the primary classification cache 315, the gateway 105 obtains 430 the classification information from the primary classification cache 315. Responsive to a determination that the classification information is not in the primary classification cache 315, the gateway 105 obtains 435 the classification information from the classifier module 110 via the out-of-band communications channel 135. In addition, the gateway 105 stores the classification information in the primary classification cache 315.

After obtaining the classification information, the gateway 105 continues processing 440 with respect to the file using the classification information and the security and/or audit rules. Based on the processing, the gateway 105 then determines 445 whether any security and/or audit-related actions are required. If the gateway 105 determines that security and/or audit-related actions are required, the gateway 105 performs 450 the actions. For example, the gateway 105 may set a file access rule restricting the user device that requested access to the file from further retrieving the requested file in the future. The gateway 105 may additionally log or record any previous accesses to the file by the user device in an audit log. If the gateway 105 determines that performance of security and/or audit-related actions are not required, the gateway 105 returns to monitoring network traffic.

Figure 5:
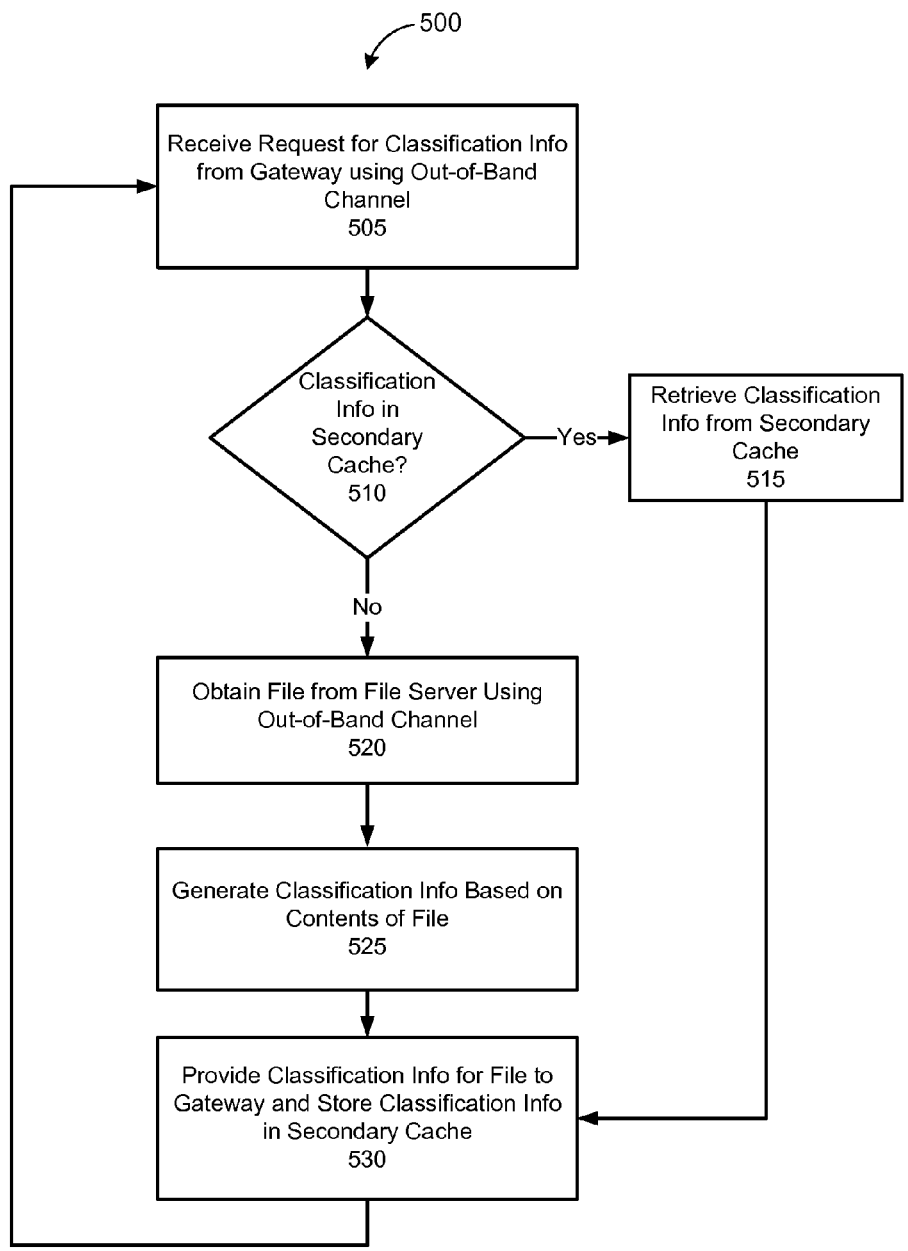
FIG. 5 is a flow chart illustrating a method for performing on-demand content classification using an out-of-band communications channel by a classifier module according to one embodiment.

FIG. 5 is a flowchart illustrating a method for performing on-demand content classification using an out-of-band communications channel by a classifier module according to one embodiment. Other embodiments can perform the steps of the method in different orders and can include different, additional and/or fewer steps. The method shown in FIG. 5 can be performed by the classifier module 110. In the method, the classifier module 110 receives 505 a request for classification information from the gateway 105 over the out-of-band communications channel 135. Thereafter, the classifier module 110 determines 510 whether the classification information for the file is stored by the secondary classification cache 355. If the classification information is stored by the secondary classification cache 355, the classifier module 110 retrieves 515 the classification information from the secondary classification cache 355. If the classification information is not stored by the secondary classification cache 355, the classifier module 110 obtains 520 the file from the file server 120 using the out-of-band communications channel 135. The classifier module 110 then generates 525 classification information based on the contents of the file. The classification information may indicate any sensitive data types included in the contents of the file, if any. The classifier module then provides 530 the classification information for the file to the gateway 105 via the out-of-band communications channel 135. The classifier module additionally stores the classification information in the secondary classification cache 355.

Figure 6A:
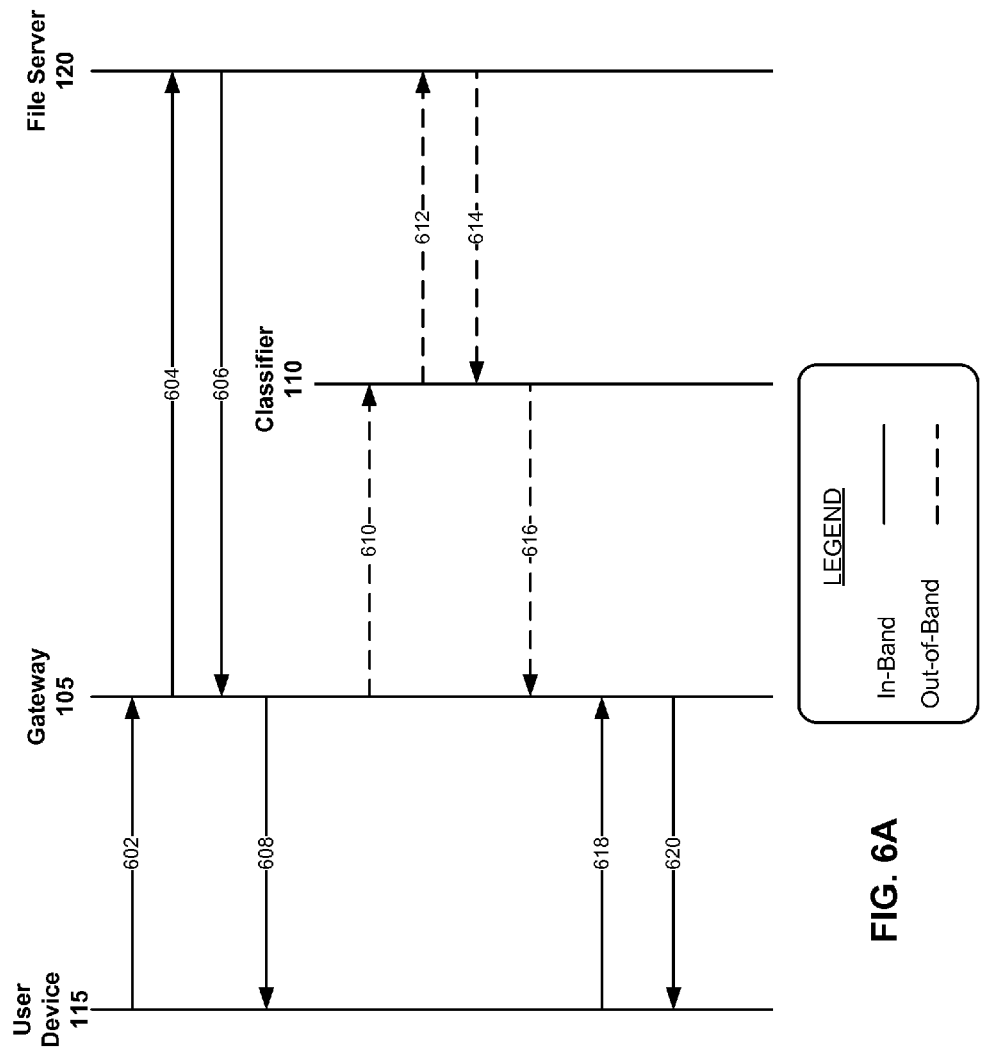
FIG. 6A is an interaction diagram illustrating an example method for performing on-demand content classification using an out-of-band communications channel according to one embodiment.

VI. Interaction Diagrams of on-Demand Content Classification Using an Out-of-Band Communications Channel FIG. 6A is an interaction diagram illustrating an example method for performing on-demand content classification using an out-of-band communications channel according to one embodiment. Other embodiments can perform the steps of the method in different orders and can include different, additional and/or fewer steps.

As shown in FIG. 6A, communications occurring over the in-band channel are represented with solid lines, while communications occurring over the out-of-band channel are represented with broken lines. In FIG. 6A, the user device 115 sends 602 a request to access a file to the file server 120 via the gateway 105 using the in-band channel 132. Upon receiving the file access request, the gateway 105 sends 604 the request to the file server 120 via the in-band channel 132. Responsive to receiving the request, the file server 120 retrieves the file indicated by the request. The file server 120 thereafter sends 606 the retrieved file to the user device 115 via the gateway 105 using the in-band channel 132. The gateway 105, after receiving the retrieved file, sends 608 the file to the user device 115 via the in-band channel 132.

In addition to facilitating the access to the file by user device 115, the gateway 105 further analyzes the file access request based on one or more security and/or audit rules. In analyzing the file access request, the gateway 105 determines that classification information for the requested file is required, and searches for the classification information in the primary classification cache 315. In the present example, classification information for the file is not stored by the primary classification cache 315. Thus, the gateway 105 sends 610 a request for classification information for the file to the classifier module 110 via the out-of-band communications channel 135. The classifier module 110, in turn, determines that classification information for the file is not stored in the secondary classification cache 355. Thus, the classifier module 110 sends 612 a request for the file to the file server 120 via the out-of-band communications channel 135. Responsive to the request, the file server 120 retrieves the file. Following retrieval, the file server 120 sends 614 the file to the classifier module 110 via the out-of-band communications channel 135. The classifier module 110 then analyzes the contents of the file for sensitive types of data, and includes any identified sensitive types of data in classification information for file. The classifier module 110 subsequently sends 616 the classification information to the gateway 105 via the out-of-band communications channel 135. Based on the classification information and the one or more security and/or audit rules, the gateway 105 determines that the user device 115 should not have future access to the file. At a later time, the user device 115 sends 618 another request for the file. Because the gateway 105 previously determined that the user device 115 should not have future access to the file, the gateway sends 620 an indication to the user device 115 that it is not authorized to access the file.

Figure 6B:
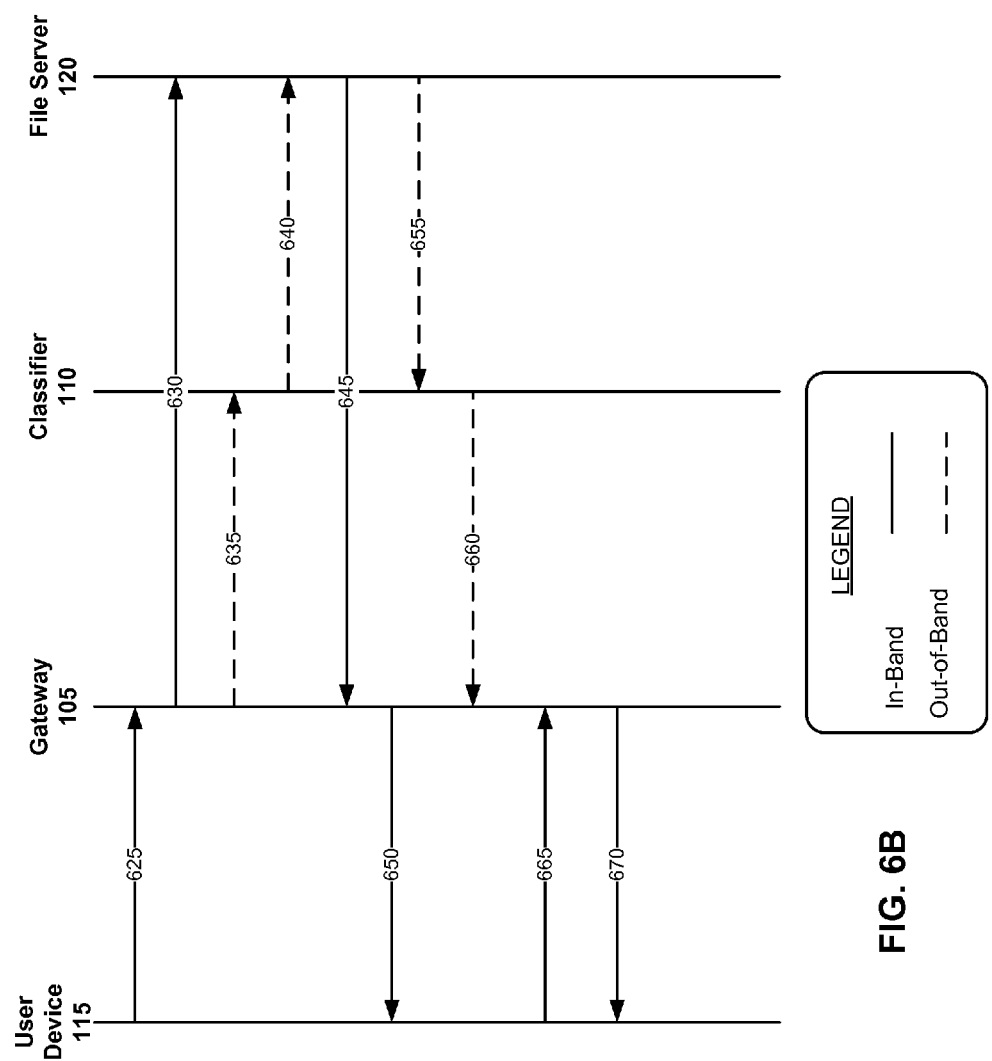
FIG. 6B is an interaction diagram illustrating an example method for performing on-demand content classification using an out-of-band communications channel according to another embodiment.

FIG. 6B is an interaction diagram illustrating an example method for performing on-demand content classification using an out-of-band communications channel according to another embodiment. Other embodiments can perform the steps of the method in different orders and can include different, additional and/or fewer steps. The interaction diagram shown in FIG. 6B is similar to the interaction diagram shown in FIG. 6A, except that the communications between the various entities are performed in a different order.

As shown in FIG. 6B, the user device 115 sends 625 a request to access a file to the file server 120 via the gateway 105 using the in-band channel 132. Upon receiving the file access request, the gateway 105 sends 630 the request to the file server 120 via the in-band channel 132. In addition to facilitating access to the file by user device 115, the gateway 105 further analyzes the file access request based on one or more security and/or audit rules. In analyzing the file access request, the gateway 105 determines that classification information for the file is required, and searches for the classification information in the primary classification cache 315. In the present example, classification information for the file is not stored by the primary classification cache 315. Thus, shortly after sending the file access request to the file server 120, the gateway 105 also sends 635 a request for classification information for the file to the classifier module 110 via the out-of-band communications channel 135. Upon receiving the request for classification information, the classifier module 110 determines that such information is not stored in the secondary classification cache 355. Thus, the classifier module 110 sends 640 a request for the file to the file server 120 via the out-of-band communications channel 135. In the interim, the file server sends 645 the file requested by the user device 115 to the gateway 105 via the in-band channel 132. The gateway 105, in turn, sends 650 the requested file to the user device 115 via the in-band channel 132. Thereafter, the file server 120 sends 655 the requested file to the classifier module 110 via the out-of-band communications channel 135. The classifier module 110 processes the contents of the file to generate classification information for the file. The classifier module 110 then sends 660 the classification information for the file to the gateway 105 via the out-of-band communications channel 135. In the present example, the gateway 105 determines that the user device 115 should not have future access to the file based on the classification information and the one or more security and/or audit rules. At a later time, the user device 115 sends 665 another request to access the file. Because the gateway 105 previously determined that the user device 115 should not have future access to the file, the gateway sends 670 an indication to the user device 115 that it is not authorized to retrieve the file.

It will be appreciated that in both of the described examples, a file later determined to be restricted is initially provided to the user device 115. However, in many software applications, a file is required to be accessed several times before it can be viewed by a user of a user device executing the software application. Thus, transfer of a file in a single instance does not impact file security. It will be further appreciated that in other embodiments, the file server 120 and/or the gateway 105 delays any transfer of a file to a user device 115 until classification information is obtained, and security and/or audit rules evaluated.

As an example, communications between the entities of the environment 100 may be facilitated using the hypertext transfer protocol (HTTP) as the network access protocol. When a file access request is received by the gateway 105 from the user device 115 and classification information for the file is not located in the primary classification cache 315, the gateway 105 sends an HTTP 307 response to the user device 115 rather than forwarding the file access request to the file server 120. This way, while the gateway 105 waits for classification information from the classifier module 110, the user device 115 is instructed to retransmit the request. In doing so, any unauthorized access can be blocked.

As another example, communications between the entities of the environment 100 may be facilitated using CIFS or NFS as the network access protocol. When a message is received by the gateway 105 destined for the file server 120, the message is validated by the gateway 105. Only after a successful validation (including obtaining and evaluating classification information, if needed) is the message delivered to the file server 120. In doing so, any unauthorized access can also be blocked.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer-implemented method for on-demand classification of content using an out-of-band communications channel comprising:
    monitoring communications to a server over an in-band communications channel;
    identifying, based on the communications, a request to access a particular file stored by the server;
    identifying one or more rules based on the request to access the particular file;
    determining that the one or more rules specify that classification information for contents of the particular file should be evaluated;
    determining that the classification information for the contents of the particular file is not available;
    obtaining classification information for the particular file from a classifying entity via an out-of-band communications channel different from the in-band communications channel; and
    performing processing based on the classification information for the contents of the particular file and the identified one or more rules, the processing comprising evaluating the classification information to determine whether the contents of the particular file include one or more sensitive types of data.

2. The computer-implemented method of claim 1, further comprising storing the obtained classification information for the contents of the particular file in an associated classification cache.

3. The computer-implemented method of claim 1, wherein performing processing based on the classification information for the contents of the particular file and the identified one or more rules further comprises:
    determining, based on the one or more rules, that access to a file having contents that include the one or more sensitive types of data is restricted; and
    restricting access to the particular file based on the determination that access to a file having contents including the one or more sensitive types of data is restricted.

4. The computer-implemented method of claim 1, wherein performing processing based on the classification information for the contents of the particular file and the identified one or more rules comprises:
    determining, based on the one or more rules, that access to a file having contents that include the one or more sensitive types of data is to be recorded; and
    recording information describing the request to access the particular file in an audit log associated with the server.

5. The computer-implemented method of claim 1, wherein the one or more sensitive types of data include at least one of: financial records, health records, credit card data, personal information, or user access information.

6. The computer-implemented method of claim 1, wherein the out-of-band communications channel is established over a different network than a network over which the in-band communications channel is established.

7. The computer-implemented method of claim 1, wherein obtaining the classification information comprises:
    transmitting a request for the particular file to the server via the out-of-band communications channel;
    responsively receiving the particular file from the server via the out-of-band communications channel; and
    generating classification information for the contents of the particular file based on an analysis of the contents of the file received from the server.

8. The computer-implemented method of claim 7, wherein generating the classification information for the contents of the particular file comprises:
    determining whether an existing classification job associated with the particular file is in a classification queue;
    responsive to determining that an existing classification job associated with the particular file is in the classification queue, associating the existing classification job with the received request to access the particular file stored by the server; and responsive to determining that an existing classification job associated with the particular file is not in the classification queue, adding a new classification job to the classification queue, wherein the new classification job is associated with the received request to access the particular file stored by the server.

9. The computer-implemented method of claim 1, wherein obtaining the classification information comprises:
transmitting a request for classification information to the classifying entity via the out-of-band communications channel different from the in-band communications channel;
responsively receiving classification information for the contents of the particular file from the classifying entity via the out-of-band communications channel; and
storing the received classification information for the contents of the particular file in an associated classification cache.

10. The computer-implemented method of claim 9, wherein transmitting the request for classification information to a classifying entity comprises:
determining a load level associated with each of a plurality of classifying entities;
selecting the classifying entity from the plurality of classifying entities based at least in part on the determined load levels; and
transmitting the request for classification information to the classifying entity.

11. The computer-implemented method of claim 1, further comprising:
storing a set of classification information in local cache for a plurality of files;
wherein the determining that the classification information is not available comprises determining that the classification information is not available in the local cache.

12. A non-transitory computer-readable medium storing executable computer instructions for on-demand classification of content using an out-of-band communications channel, the computer instructions comprising instructions for:
monitoring communications to a server over an in-band communications channel;
identifying, based on the communications, a request to access a particular file stored by the server;
identifying one or more rules based on the request to access the particular file;
determining that the one or more rules specify that classification information for contents of the particular file should be evaluated;
determining that the classification information for the contents of the particular file is not available;
obtaining classification information for the particular file from a classifying entity via an out-of-band communications channel different from the in-band communications channel; and
performing processing based on the classification information for the contents of the particular file and the identified one or more rules, the processing comprising evaluating the classification information to determine whether the contents of the particular file include one or more sensitive types of data.

13. The non-transitory computer-readable medium of claim 12, further comprising instructions for storing the obtained classification information for the contents of the particular file in an associated classification cache.

14. The non-transitory computer-readable medium of claim 12, wherein the instructions for obtaining the classification information comprise instructions for:
transmitting a request for classification information to the classifying entity via the out-of-band communications channel different from the in-band communications channel;
responsively receiving classification information for the contents of the particular file from the classifying entity via the out-of-band communications channel; and
storing the received classification information for the contents of the particular file in an associated classification cache.

15. The non-transitory computer-readable medium of claim 12, wherein the out-of-band communications channel is established over a different network than a network over which the in-band communications channel is established.

16. A system for on-demand classification of content using an out-of-band communications channel, the system comprising:
a non-transitory computer-readable storage medium storing executable computer program instructions comprising instructions for:
monitoring communications to a server over an in-band communications channel;
identifying, based on the communications, a request to access a particular file stored by the server;
identifying one or more rules based on the request to access the particular file;
determining that the one or more rules specify that classification information for contents of the particular file should be evaluated;
determining that the classification information for the contents of the particular file is not available;
obtaining classification information for the particular file from a classifying entity via an out-of-band communications channel different from the in-band communications channel; and
performing processing based on the classification information for the contents of the particular file and the identified one or more rules, the processing comprising evaluating the classification information to determine whether the contents of the particular file include one or more sensitive types of data; and
a processor for executing the computer program instructions.

17. The system of claim 16, further comprising instructions for storing the obtained classification information for the contents of the particular file in an associated classification cache.

18. The system of claim 16, wherein the instructions for obtaining the classification information comprise instructions for:
transmitting a request for classification information to the classifying entity via the out-of-band communications channel different from the in-band communications channel;
responsively receiving classification information for the contents of the particular file from the classifying entity via the out-of-band communications channel; and
storing the received classification information for the contents of the particular file in an associated classification cache.

* * * * *